UNITED STATES PATENT OFFICE.

ALEXANDER E. OUTERBRIDGE, JR., OF PHILADELPHIA, PENNSYLVANIA.

SAND CORE FOR MOLDS FOR CASTING METAL AND PROCESS OF THE MANUFACTURE OF SUCH CORES.

1,324,208.

Specification of Letters Patent.

Patented Dec. 9, 1919.

No Drawing.

Application filed July 8, 1919. Serial No. 309,381.

*To all whom it may concern:*

Be it known that I, ALEXANDER E. OUTERBRIDGE, Jr., of Chestnut Hill, Philadelphia, in the county of Philadelphia and State of Pennsylvania, have invented certain new and useful Improvements in Sand Cores for Molds for Casting Metals and in Processes of the Manufacture of Such Cores, whereof the following is a specification.

In the manufacture of sand cores, various binding ingredients have heretofore been employed, all of which are attended with some disadvantages, either in the initial process of forming the core, or in the preservation of the core after completion and during use, or in the recovery of the sand for subsequent use.

The present invention has for its object the minimizing of these disadvantages and consists in the discovery that the substance known commercially as "casein," whether of animal or vegetable origin, manifests peculiar properties when employed under proper conditions as a binding material for the sand. I believe that notwithstanding the use of the so-called commercial casein for many purposes which might, in a certain sense, be said to resemble that of glue, its peculiar availability as an ingredient for the manufacture of sand cores, has not been suspected, and that I am the first to discover and utilize its specific properties in that relation.

The commercial casein to which I refer may, for practical purposes, be described by reference to its origin, as follows, viz.—that type which is made by treating milk with acids and subsequently neutralizing the acidity with an alkaline ingredient, and another type which closely resembles the milk casein in physical qualities, but which is expressed from leguminous plants, such as peas, beans, etc., this latter type being sometimes commercially termed "legumin" or vegetable casein.

By prolonged investigations and experiments I have found that either type of casein may be employed under certain conditions in connection with sand of proper character for the formation of cores, a typical instance being as follows:

I prepare a solution of casein of the proper character for intimate commingling with and coating the sand grains, preferably by first making a thick paste by stirring the animal or vegetable casein in water, which may be quite cold. I then reduce the consistency of this paste by adding sufficient water to make a relatively mobile or fluent material, comparable to thin mucilage, I then diffuse this liquid throughout a mass of either sharp sand alone, or sand with a moderate amount of flour, pulverized clay, or other similar finely divided solid material, although I prefer to omit these last mentioned substances.

The proportions may vary, but a fair average proportion consists in one pound of casein diluted with two or three pounds of water to one hundred pounds of sand. The ingredients should be commingled with great thoroughness so that, as far as possible, each grain of the sand may become coated with a film of the casein solution, but without any substantial excess of the latter.

The mass, while still in a moist condition, can be molded to the proper form even without tamping. It is then placed in an oven and indurated sufficiently for coherence by baking at a moderate temperature, say 350° F., the time depending upon the size of the core, say from one to twelve hours. When the core has set in its final form, it is ready for immediate use, or may be preserved.

I have found that the process and product above described has many advantages, notably, as follows: The relatively thin casein solution, which is adequate for the purpose, can be intimately and uniformly commingled with the sand with great facility, and the moist mass is remarkably coherent, so that the shaping of the core and its transportation to the baking furnace are facilitated.

The finished cores are non-hygroscopic and can be preserved without deterioration for an indefinite time; in use they are comparatively free from any tendency to evolve gas, which, in the case of cores of the ordinary character, is liable to impair the casting; they are adequately coherent, especially as compared with the so-called oil cores now largely used; finally, after use at the high temperature characteristic of the casting process, the sand of the core, instead of assuming a stone-like condition, possesses such mobility that it can be poured out like ordinary dry sand, and can be used over and over again without any preparatory treatment whatever.

In ordinary forms of sand cores, it is necessary to break up and pick out the hard lumps and grind them into powder, in case it is desired to use the material over again, and with the so-called oil sand cores, it is customary to put the lumps into a furnace and burn out the unconsumed oil in order to restore the same into a condition proper for use.

By the employment of my present invention, not only is a superior core obtained, but the immediate availability of the sand for repeated use is very desirable.

I use the term "casein" in a broad sense, to denote the material commercially known by that name, whether the same be of animal or vegetable origin, and hence it will be noted that the expression is not employed with the limitation characteristic of strict chemical nomenclature.

Having thus described my invention, I claim:—

1. A heat-indurated core comprising molding sand, in combination with casein, intimately intermingled with the solid particles and forming a coherent mass.

2. The hereinbefore described improvement in the process of making sand cores for castings, which consists in intimately commingling with molding sand, a charge of casein in solution; forming the combined materials into shape while in a moist condition; and then baking the shaped mass, substantially as set forth.

In testimony whereof, I have hereunto signed my name at Philadelphia, Pennsylvania, this seventh day of July, 1919.

ALEXANDER E. OUTERBRIDGE, JR.

Witnesses:
JAMES H. BELL,
E. L. FULLERTON.